United States Patent
Tangudu et al.

(10) Patent No.: US 12,464,052 B2
(45) Date of Patent: Nov. 4, 2025

(54) METHOD AND SYSTEM FOR DISCOVERING A TARGET APPLICATION PROGRAM INTERFACE

(71) Applicant: Samsung Electronics Co., Ltd., Suwon-si (KR)

(72) Inventors: Narendranath Durga Tangudu, Bangalore (IN); Basavaraj Jayawant Pattan, Bangalore (IN); Erik Arthur Guttman, Bangalore (IN); Nishant Gupta, Bangalore (IN); Suresh Chitturi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/283,150

(22) PCT Filed: Mar. 23, 2022

(86) PCT No.: PCT/KR2022/004056
§ 371 (c)(1),
(2) Date: Sep. 20, 2023

(87) PCT Pub. No.: WO2022/203386
PCT Pub. Date: Sep. 29, 2022

(65) Prior Publication Data
US 2024/0163342 A1     May 16, 2024

(30) Foreign Application Priority Data
Mar. 23, 2021   (IN) .............................. 202141012598
Mar. 21, 2022   (IN) ............................ 2021 41012598

(51) Int. Cl.
*H04L 67/51*       (2022.01)
*H04L 41/0806*    (2022.01)
(Continued)

(52) U.S. Cl.
CPC .......... *H04L 67/51* (2022.05); *H04L 41/0806* (2013.01); *H04L 41/0895* (2022.05)

(58) Field of Classification Search
CPC . H04L 67/51; H04L 41/0806; H04L 41/0895; H04L 61/4511; H04L 61/4541
See application file for complete search history.

(56) References Cited

U.S. PATENT DOCUMENTS

2021/0084071 A1*   3/2021   Mandrychenko ... H04L 63/1483
2021/0144550 A1*   5/2021   Ito ....................... H04W 12/069
(Continued)

FOREIGN PATENT DOCUMENTS

CA      3 126 566 A1     7/2020
EP      3 726 379 A1    10/2020
(Continued)

OTHER PUBLICATIONS

ETSI, Common API framework for 3GPP northbound APIs (3GPP TS 23.222 version 16.9.0 Release 16), ETSI TS 123 222 V16.9.0, Oct. 2020.
(Continued)

*Primary Examiner* — Kamal M Hossain
(74) *Attorney, Agent, or Firm* — Jefferson IP Law, LLP

(57) ABSTRACT

The disclosure relates to a 5G or 6G communication system for supporting a higher data transmission rate. In an embodiment, a method performed by a CCF, for discovering an API serving a UE is disclosed. The method includes receiving a service API discover request message from an API invoker for determining one or more service APIs serving one or more UE. service API discover request message comprises one or more UE IDs and a plurality of parameters associated with one or more UE. The method includes retrieving a first service API information associated with one or more UE IDs and the plurality of parameters from a memory, transmitting, (Continued)

to API invoker a service API discover response comprising first service API information based on service API discover request message.

20 Claims, 9 Drawing Sheets

(51) Int. Cl.
*H04L 41/0895* (2022.01)
*H04L 61/4511* (2022.01)
*H04L 61/4541* (2022.01)

(56) References Cited

U.S. PATENT DOCUMENTS

| | | | | |
|---|---|---|---|---|
| 2023/0188519 A1* | 6/2023 | Hu | ............ | H04L 63/0853 726/4 |
| 2023/0359515 A1* | 11/2023 | Xu | ............ | G06F 9/547 |
| 2024/0298170 A1* | 9/2024 | Xu | ............ | H04W 8/26 |

FOREIGN PATENT DOCUMENTS

| | | |
|---|---|---|
| IN | 201941023952 A | 12/2020 |
| WO | 2018/001749 A1 | 1/2018 |
| WO | 2019/098730 A1 | 5/2019 |
| WO | 2019/194242 A1 | 10/2019 |
| WO | 2020/238411 A1 | 12/2020 |

OTHER PUBLICATIONS

Indian Office Action dated Oct. 7, 2022, issued in Indian Application No. 202141012598.
International Search Report and written opinion dated Jun. 16, 2022, issued in International Application No. PCT/KR2022/004056.
ETSI, LTE; 5G; Common API framework for 3GPP Northbound APIs (3GPP TS 23.222 version 16.9.0 Release 16) XP 014389441A, ETSI TS 123 222 V16.9.0, Technical Specification, Oct. 27, 2020.
Extended European Search report dated Apr. 23, 2024, issued in European Application No. 22776086.5-1206.

* cited by examiner

【Figure 1】
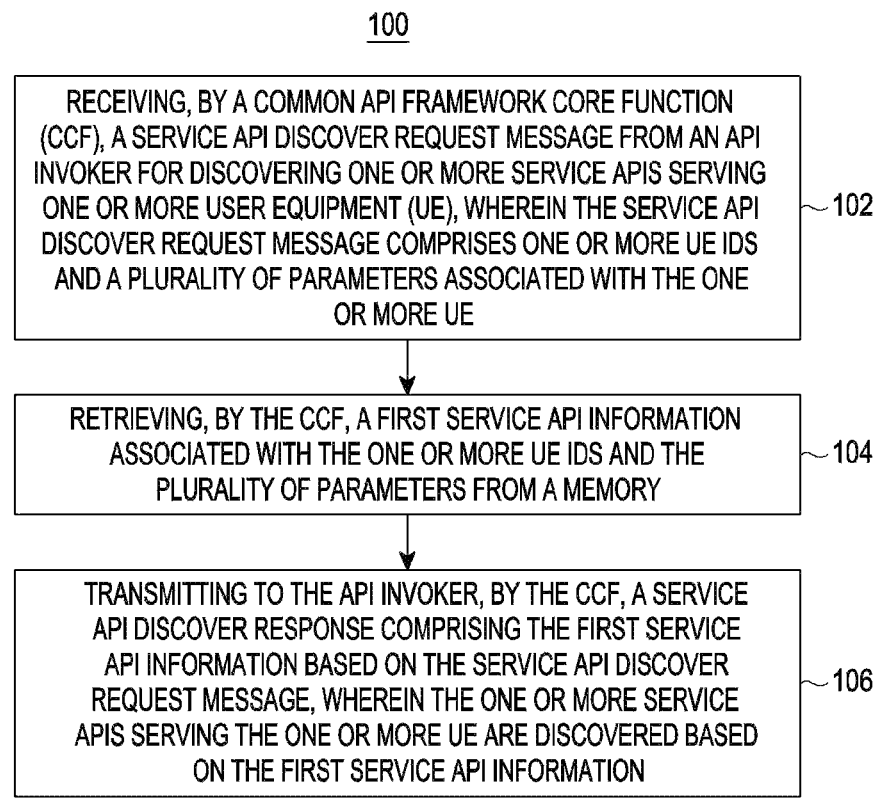

【Figure 2】
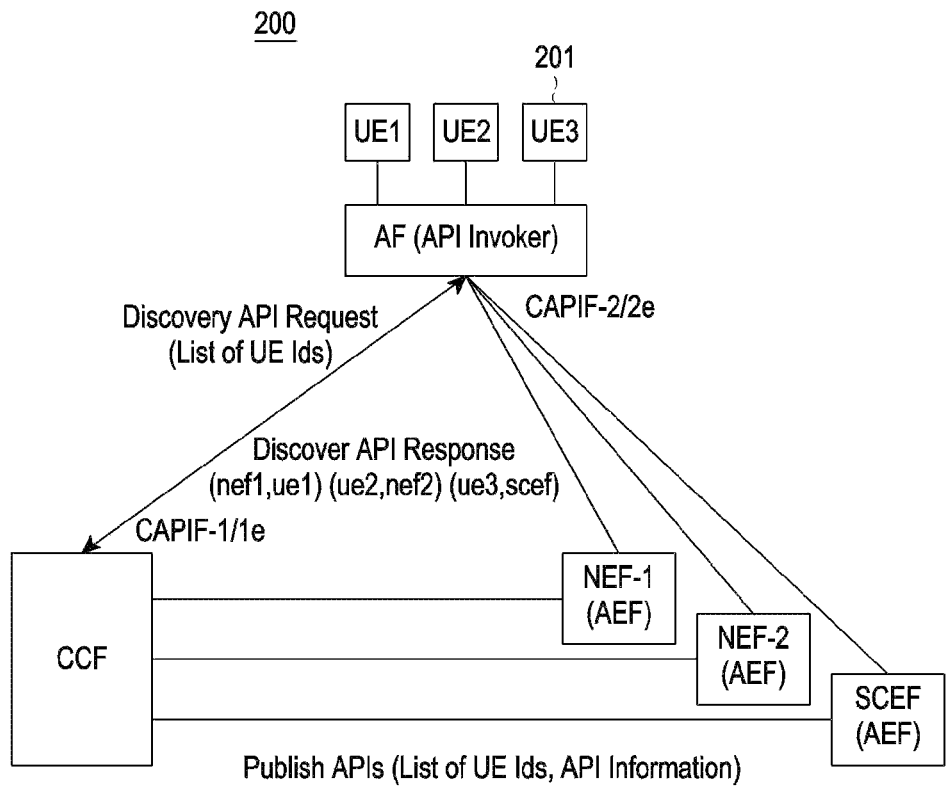
【Figure 3】
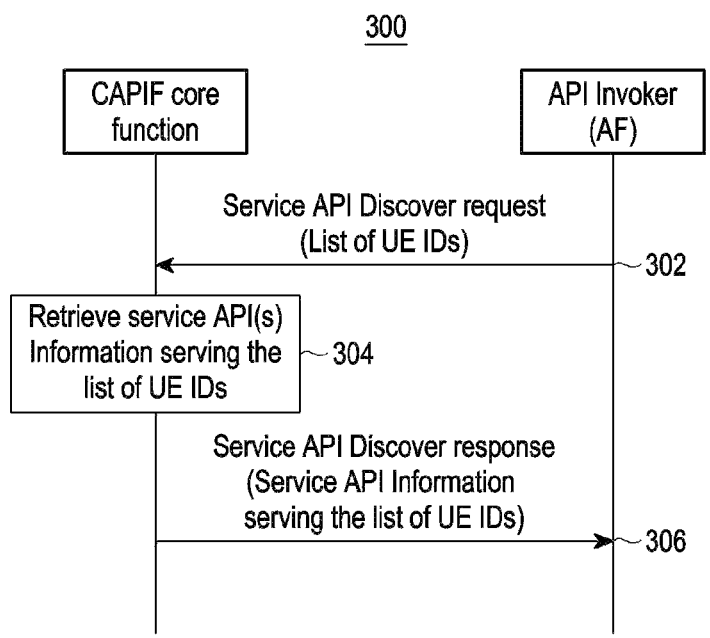

【Figure 4】
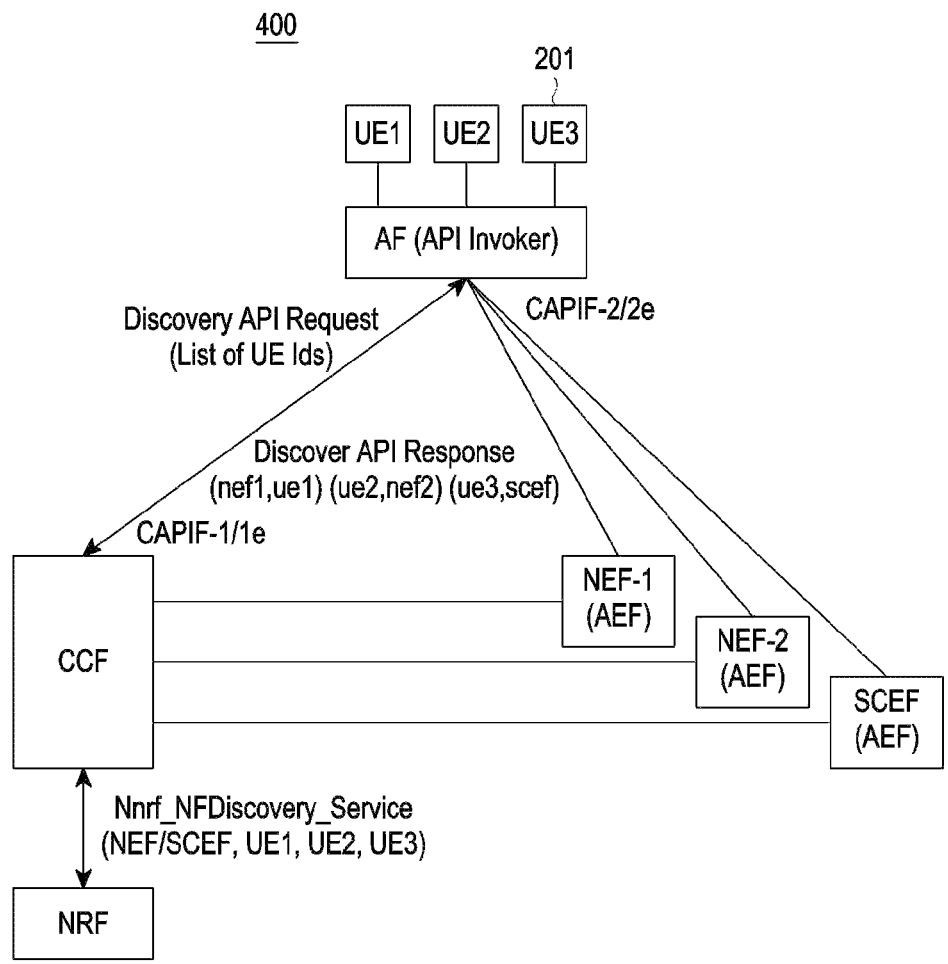

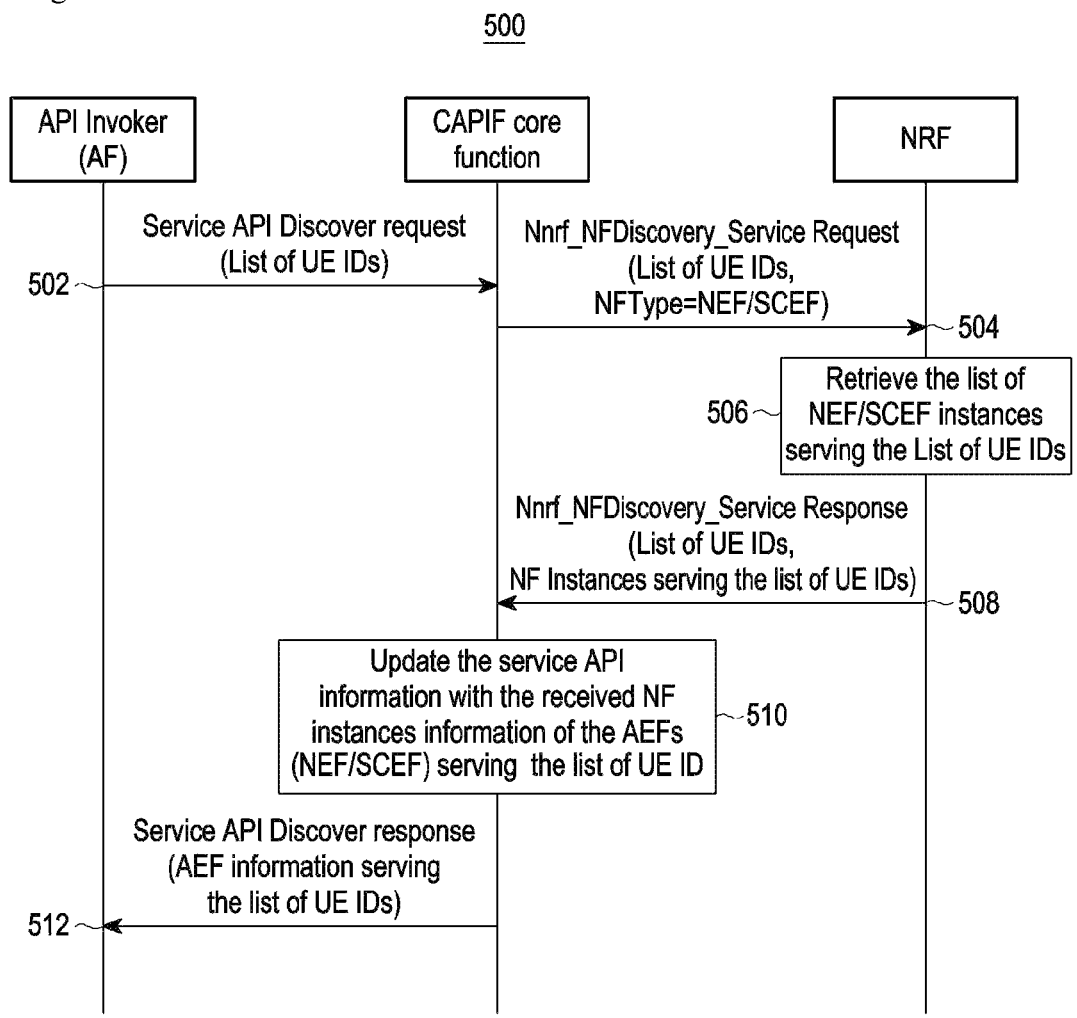

[Figure 6]
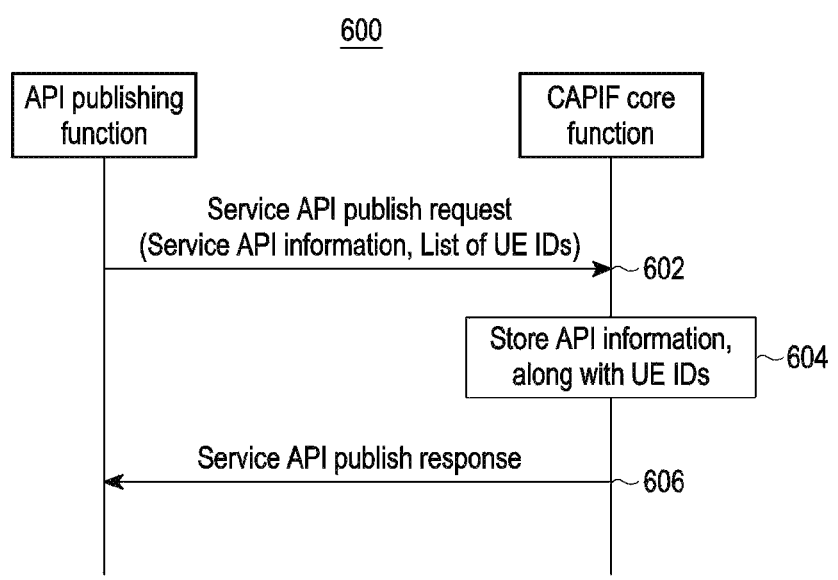

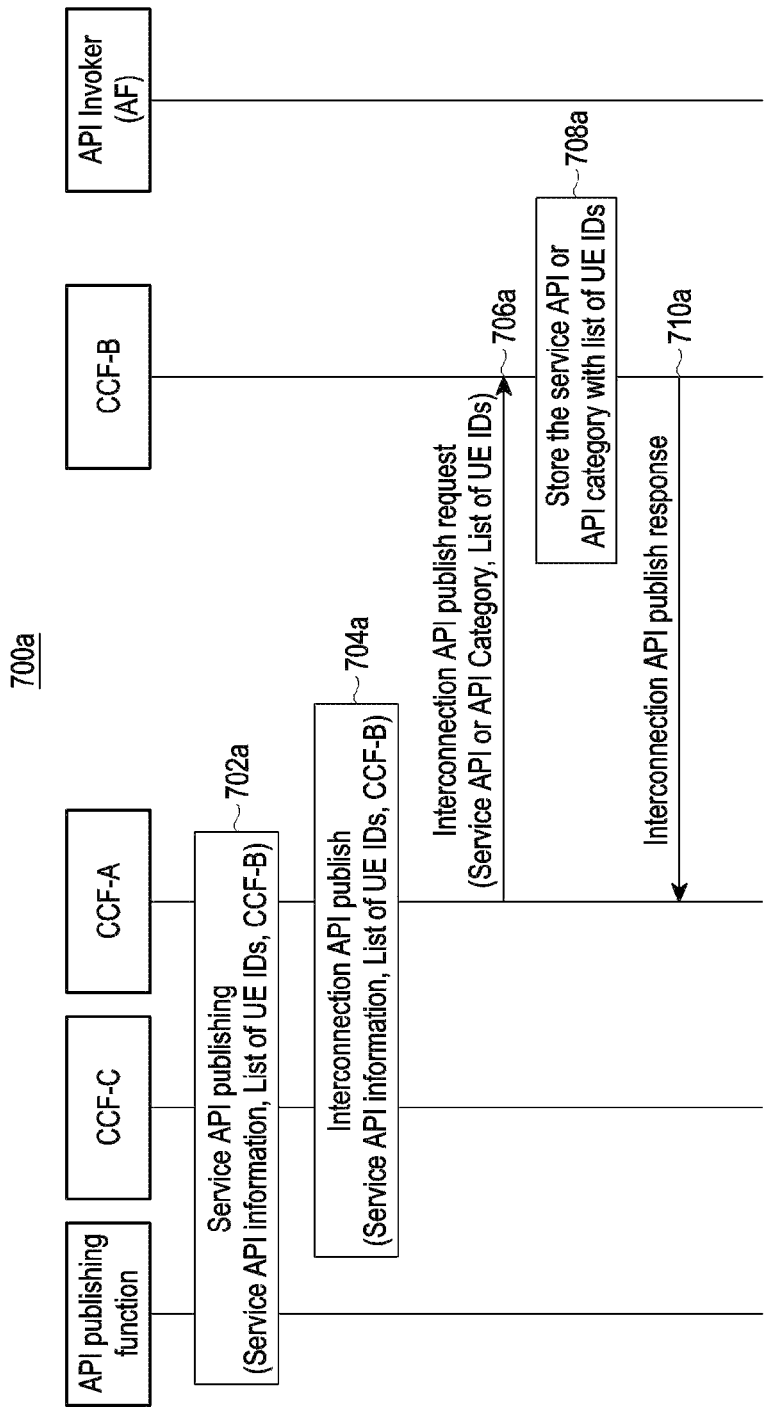
[Figure 7a]

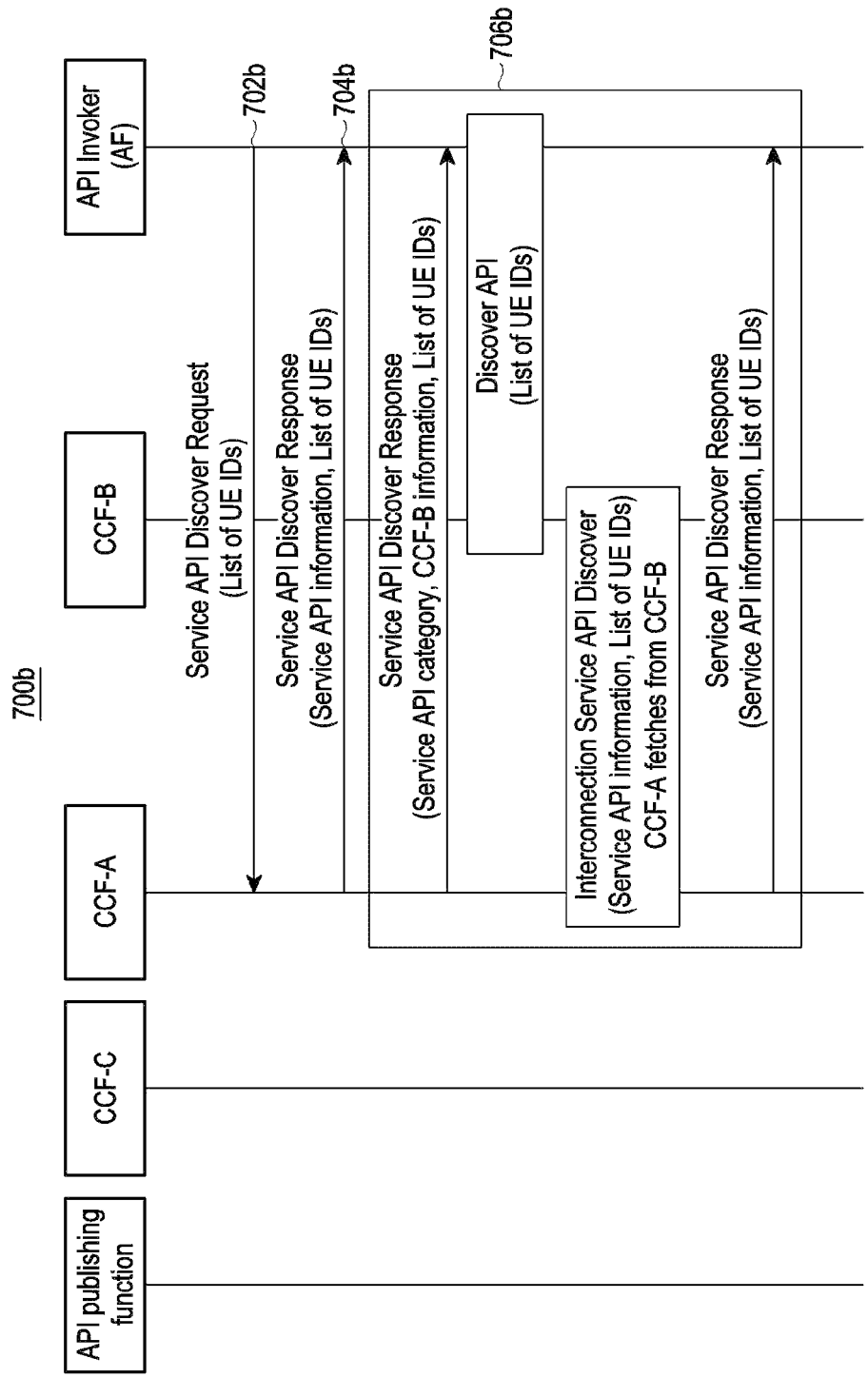
[Figure 7b]

【Figure 8】
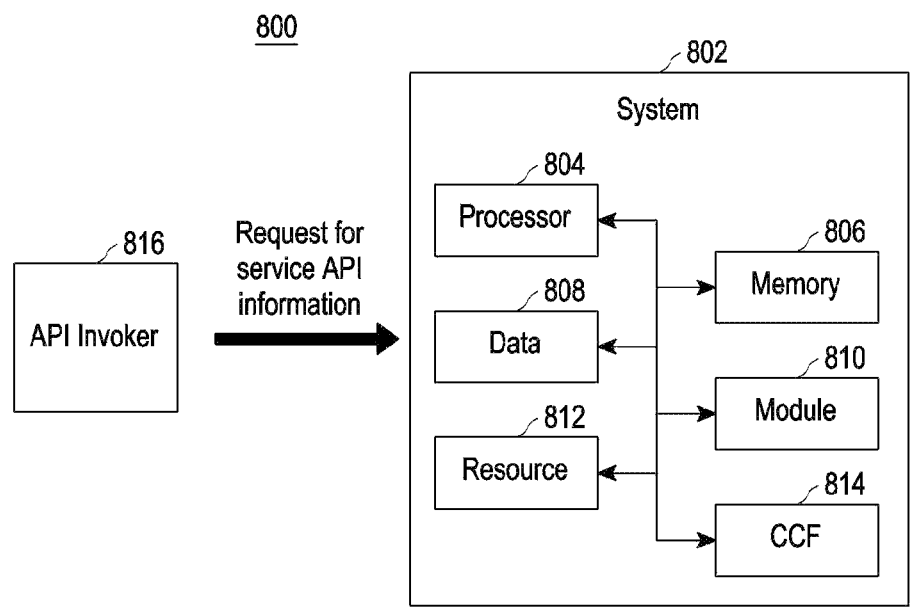
【Figure 9】
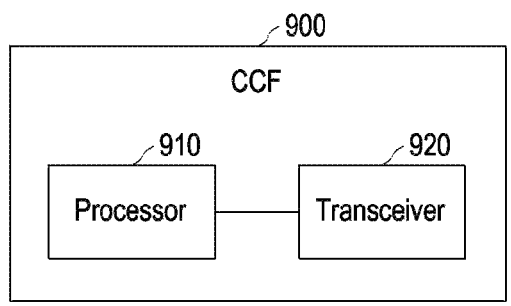

[Figure 10]
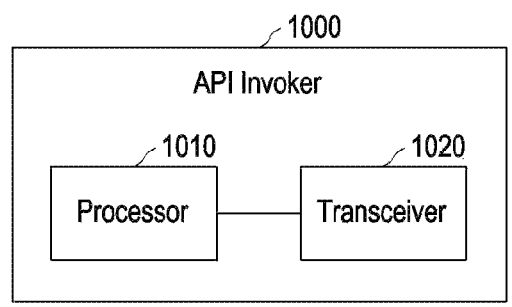

METHOD AND SYSTEM FOR DISCOVERING A TARGET APPLICATION PROGRAM INTERFACE

CROSS-REFERENCE TO RELATED APPLICATION(S)

This application is a U.S. National Stage application under 35 U.S.C. § 371 of an International application number PCT/KR2022/004056, filed on Mar. 23, 2022, which is based on and claims the benefit of an Indian Provisional patent application number 202141012598, filed on Mar. 23, 2021, in the Indian Intellectual Property Office, and of an Indian Complete patent application number 202241050570, filed on Mar. 21, 2022, in the Indian Intellectual Property Office, the disclosure of each of which is incorporated by reference herein in its entirety.

TECHNICAL FIELD

The present disclosure, in general, relates to wireless communication, in particular, relates to systems and methods for discovering a target Application Programming Interface (API) for a User Equipment (UE).

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Traditionally, 3GPP exposes the network services for consumption by third party Application Functions (AF) through northbound APIs. Most of the northbound APIs are related to UEs and may affect their service experience. A Network Exposure Function (NEF) and a Service Capability Exposure Function (SCEF) are the key functional entities that expose the 3GPP network services through northbound APIs as specified in 3GPP TS 29.522 and 3GPP TS 29.122 respectively. The 3GPP also defines the architectures for enabling the vertical specific applications over the 3GPP networks. Such architectures also define their services as northbound APIs, at the enabler layer for the consumption by vertical specific applications. For example, Service Enabler Architecture Layer for Verticals as specified in 3GPP TS 23.434. 3GPP specified Common API Framework (CAPIF) in TS 23.222, to define the common aspects that are applicable to all the northbound APIs. One of the functionalities of CAPIF is API discovery service, which enables any Application Function consuming the northbound APIs, to discover the API Exposing Function (AEF) details that expose the northbound APIs. As per CAPIF, an AEF is the functional entity exposing the northbound APIs, for example, NEF, SCEF etc.

An AF may be serving UEs belonging to multiple PLMNs. Moreover, it is possible that there could be multiple instances of a functional entity (like NEF), within a PLMN, serving the northbound APIs for different set of UEs. In such a scenario, it is not clear how the Application Function determines the location (like NEF instance information) of the target API serving the specific UEs, that the AF wants to consume. As per TS 23.222, currently the CAPIF_Discover_Service_API API does not support to discover the APIs based on a UE or a set of UEs.

In addition, when the AF is not aware of the PLMN provider of the UEs and has to discover the target API location for a specific set of UEs, then it is not clear which PLMN and the CAPIF Core Function (CCF) should the AF contact to discover the service APIs information.

3GPP defined northbound APIs identify a UE with the various identifiers, namely, MSISDN, External Identifier, GPSI, UE IP address and like so. The above stated shortcoming and the solutions apply to all of these UE identification mechanisms.

The above stated problem also applies to the northbound APIs exposed by the 3GPP vertical enabler layers for the consumption by vertical specific applications. Some examples of vertical enabler layers specified by 3GPP are, Service Enabler Architecture Layer for Verticals as specified in 3GPP TS 23.434, Vehicle-to-Everything (V2X) services as specified in 3GPP TS 23.486, Architecture for enabling Edge Applications as specified in 3GPP TS 23.558, Application layer support for Unmanned Aerial System as specified in 3GPP TS 23.255, and like so. These vertical enabler layer architectures define the functional entities on the UE side. Such UE side functional identities are defined in the respective architectures like, VAL USER ID, VAL UE ID in SEAL, EEC ID in EDGEAPP (3GPP TS 23.558) and like so. It is possible that the vertical enabler layer functional entities that expose the northbound APIs, will be serving UEs belonging to multiple PLMNs or UE side functional identities belonging to multiple vertical specific applications (AFs) or UE side functional identities belonging to multiple PLMNs or multiple vertical enabler layer functional entities within a service provider serve different sets of UE side functional entities. In such a scenario, it is not clear how the vertical specific application (AF) determines the location (Vertical enabler layer functional entity, like SEAL server, VAE Server etc.) of the target API serving a specific UE side functional entity.

When the AF is not aware of the PLMN provider of the UEs and has to discover the target API location for a specific set of UEs, then it is not clear which PLMN or CAPIF provider (CAPIF Core Function) should the AF contact to discover the service APIs information.

Thus, there is a need for a solution that overcomes the above deficiencies.

DISCLOSURE OF INVENTION

Technical to Problem

This summary is provided to introduce a selection of concepts, in a simplified format, that are further described in the detailed description of the invention. This summary is neither intended to identify key or essential inventive concepts of the invention and nor is it intended for determining the scope of the invention.

In accordance with some example embodiments of the present subject matter, a method, for discovering an Application Program Interface (API) serving a User Equipment (UE) is disclosed. The method includes receiving, by a Common API Framework Core Function (CCF), a service API discover request message from an API invoker for determining one or more service APIs serving one or more User Equipment (UE). The service API discover request message comprises one or more UE IDs and a plurality of parameters associated with the one or more service APIs to be discovered. The method includes retrieving, by the CCF, a first service API information associated with the one or more UE IDs and the plurality of parameters from a memory. The method further includes transmitting to the API invoker, by the CCF, a service API discover response comprising the first service API information based on the service API discover request message. The one or more service APIs serving the one or more UEs are discovered based on the first service API information.

In accordance with some example embodiments of the present subject matter, a system, for discovering an Application Program Interface (API) serving a User Equipment (UE) is disclosed. The system includes receiving, by a Common API Framework Core Function (CCF), a service API discover request message from an API invoker for determining one or more service APIs serving one or more User Equipment (UE). The service API discover request message comprises one or more UE IDs and a plurality of parameters associated with the one or more service APIs to be discovered. The system includes retrieving, by the CCF, a first service API information associated with the one or more UE IDs and the plurality of parameters from a memory. The system further includes transmitting to the API invoker, by the CCF, a service API discover response comprising the first service API information based on the service API discover request message. The one or more service APIs serving the one or more UEs are discovered based on the first service API information.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 1 illustrates an operational flow diagram depicting a method for discovering one or more service APIs serving one or more UE, in accordance with an embodiment of the present subject matter;

FIG. 2 illustrates an operational flow diagram depicting a method for publishing and a discovery of one or more APIs for one or more of UE, in accordance with an embodiment of the present subject matter;

FIG. 3 illustrates an operational flow diagram depicting a process for discovering one or more APIs serving one or more UE, in accordance with an embodiment of the present subject matter;

FIG. 4 illustrates an operational flow diagram depicting a method for discovering one or more AEFs for one or more UE, in accordance with an embodiment of the present subject matter;

FIG. 5 illustrates an operational flow diagram depicting a process for a discovery of one or more AEFs for one or more UE from an NRF, in accordance with an embodiment of the present subject matter;

FIG. 6 illustrates an operational flow diagram depicting a process for publishing and storing of service API information at a CCF, in accordance with an embodiment of the present subject matter;

FIG. 7a illustrates an operational flow diagram 700a depicting a process for storing service API information serving the one or more UE and associated with a number of CCFs, at one CCF, in accordance with an embodiment of the present subject matter; and FIG. 7b illustrates an operational flow diagram 700b depicting a process for discovering one or more service API serving one or more UE from the number of CCFs using the CAPIF interconnection, in accordance with an embodiment of the present subject matter; and FIG. 8 illustrates a schematic block diagram 800 of a system 802 for discovering one or more APIs serving one or more UE, in accordance with an embodiment of the present subject matter;

FIG. 9 illustrates various hardware components of a CCF according to embodiments as disclosed herein; and FIG. 10 illustrates various hardware components of a API invoker according to embodiments as disclosed herein.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

MODE FOR THE INVENTION

For promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises 쪌 a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

FIG. 1 illustrates an operational flow diagram 100 depicting a method for discovering one or more service APIs serving one or more UE, in accordance with an embodiment of the present subject matter. Examples of the UE may include, but are not limited to, a smartphone, a laptop, a Personal Computer (PC), and a tablet. In an embodiment, the UE may be configured to operate in on of a Long Term Evolution (LTE), and a New Radio (NR). In an embodiment, the one or more service APIs may interchangeably be referred as one or more northbound APIs. In an embodiment, the method may include determining a location of the one or more service APIs serving the one or more UE.

At block 102, the method may include receiving, by a Common API Framework Core Function (CCF), a service API discover request message from an API invoker for discovering one or more service APIs serving one or more User Equipment (UE), wherein the service API discover request message comprises one or more UE IDs and a plurality of parameters associated with the one or more service APIs to be discovered.

At block 104, the method may include retrieving, by the CCF, a first service API information associated with the one or more UE IDs and the plurality of parameters from a memory.

At block 106, the method may include transmitting to the API invoker, by the CCF, a service API discover response comprising the first service API information based on the service API discover request message, wherein the one or more service APIs serving the one or more UEs are discovered based on the first service API information.

FIG. 2 illustrates an operational flow diagram 200 depicting a method for publishing and a discovery of one or more APIs for one or more of UE 201, in accordance with an embodiment of the present subject matter. In an embodiment, the one or more APIs may interchangeably be referred as one or more northbound APIs. In an embodiment, the present subject matter includes a mechanism for an API publishing function to publish the one or more northbound APIs along with the one or more UE supported by the one or more northbound APIs. In an embodiment, the one or more northbound APIs may be published using a publish service API procedure. In an embodiment, an Application Function (AF) also referred as an API Invoker may be configured to discover details related to the one or more northbound APIs served for the one or more UE using a discover service APIs procedure.

FIG. 3 illustrates an operational flow diagram 300 depicting a process for discovering one or more APIs serving one or more UE 201, in accordance with an embodiment of the present subject matter. In an embodiment, an API invoker may be configured to initiate the discovering of the one or more service APIs serving the one or more UE 201 as referred in the FIG. 2. In an embodiment, the one or more APIs may be discovered based on first service information identifying the one or more APIs serving the one or more UE 201. In an embodiment, the first service API information related to the one or more APIs serving the one or more UE 201 may be stored at a CCF upon receiving the first service API information from an API Publishing Function (APF).

Continuing with the above embodiment, the process may include receiving (step 302) a service API discover request at a CCF from the API invoker as referred in block 102 of FIG. 1. In an embodiment, the service API discover request may be transmitted by the API invoker for discovering the one or more APIs serving the one or more UE 201 related to the API invoker. In an embodiment the service API discover request may include one or more UE IDs and a number of parameters associated with the one or more service APIs to be discovered as specified in 3GPP TS 23.222 for CAPIF_Discover_Service_API API and the like. In an embodiment, the service API discover request may be received from the API invoker using a using a CAPIF_Discover_Service_API API.

Subsequent to receiving the service API discover request by the CCF, the process may proceed towards retrieving (step 304) the first service API information at the CCF as referred in block 104 of FIG. 1. In an embodiment, the first service information may be retrieved from a memory of the CCF. In an embodiment, the memory may be storing an API registry including the first service API information. In an embodiment, the first service API information may be related to the one or more UE 201 related to the one or more UE IDs and the number of parameters present in the receive service API discover request. In an embodiment, the API registry may store the first service API information related to the one or more UE 201 corresponding to the one or more UE IDs of the one or more UE 201. In an embodiment, retrieving may be based on matching the one or more UE IDs in the service API discover request with at least one UE ID corresponding to service API information previously stored in the API registry. In an embodiment, the service API information may include the first service API information corresponding to the at least one UE ID such that the at least one UE ID matches the one or more UE IDs.

To that understanding, in response to retrieving the first service API information, the process may proceed towards transmitting (step 306) a service API discover response to the API invoker as referred in block 106 of FIG. 1. In an embodiment, the service API discover response may include the first service API information associated with the one or more UE IDs received in the service API discover request. In an embodiment, the first service information associated with the one or more UE IDs corresponding to the one or more UE 201 may be serving the one or more UE 201. In an embodiment, the first service API information may be transmitted in the form of a table in the service API discover response.

TABLE 1

| Information element | Status | Description |
| --- | --- | --- |
| Result | M | Indicates the success or failure of the discovery of the service API information |
| Service API information | O | List of service APIs corresponding to the request, including API description such as service API name, service API type, Serving Area Information (optional), List of UE IDs, interface details (e.g., IP address, port number, URI), protocols, version, data format |
| CAPIF core function identity information | O | Indicates the CAPIF core function serving the service API category provided in the query criteria |

Table 1 illustrates the first service API information

In an embodiment, the APF may include a List of UE IDs as separate information in the CAPIF_Publish_Service_API API request message, to indicate that a set of UEs related to the list of UE IDs are applicable to each service API amongst the one or more service APIs in the Service API Publish Request message. In an embodiment, the APF may be configured to specify a session ID specifically 'bound' to a published API that may be used to select a service API from the one or more service APIs by the CCF or the API Invoker subsequently. Moving forward, the published API may be used to bind the service API use to a particular UE session such that the API invoker may specifically be able to operate upon the session relevant to intended service by means of the service API. In an embodiment, the CAPIF_Discover_Service_API request may include query information or parameter based on which the list of UE IDs is to be inherently determined by the CCF.

In an embodiment, where it is determined that the CAPIF_Discover_Service_API request includes the list of UE IDs served by multiple CCFs, a CAPIF interconnection interface (CAPIF-6/6e) may be used to retrieve stored service API(s) information from multiple CCFs. In an embodiment, where it is determined that the CAPIF_Discover_Service_API request includes the list of UE IDs served by AEFs belonging to multiple API providers, the CCF may be used to retrieve the stored service API(s) information belonging to multiple API providers.

In an embodiment, where the northbound APIs are exposed by 3GPP vertical enabler layers for consumption by vertical specific applications and a UE side functional entity is in a context of the API invocation, then a list of the UE side functional entity identifiers (For example, VAL UE ID, VAL USER ID for SEAL and the like in other vertical enabler layer architectures) may be included instead of the list of UE IDs. The service APIs may be published with a list of UE side functional entity identifiers and the API Invoker (vertical specific application) may discover a target API location based on the list of UE side functional entity identifiers.

FIG. 4 illustrates an operational flow diagram 400 depicting a method for discovering one or more AEFs for one or more UE 201, in accordance with an embodiment of the present subject matter. In an embodiment, the one or more AEFs may be discovered from a Network Repository Function (NRF). In an embodiment, the one or more AEFs may include an NEF, a SCEF, or the like. In an embodiment, the present subject matter includes a method for a CCF to fetch the AEF information related to the one or more AEFs serving at least one UE from the one or more UE 201, as referred in the FIG. 2 from the NRF in a 5G core network. In an embodiment, the AEF information may be fetched using a Nnrf_NFDiscovery_Service. The NRF may be configured to support the Nnrf_NFDiscovery_Service as specified in TS 23.501 for NEF Discovery and TS 29.510 for Nnrf_NFDiscovery_Service API or expose a new service such as an Nnrf_ServiceRequest or an Nnrf_xxx for the CCF to fetch the one or more AEFs. In an embodiment, the AEF information may interchangeably be referred as an API Exposing Function information serving the at least one UE from the one or more UE 201.

FIG. 5 illustrates an operational flow diagram 500 depicting a process for a discovery of one or more AEFs for one or more UE 201 from an NRF, in accordance with an embodiment of the present subject matter. In an embodiment, an API invoker may be configured to initiate discovering the one or more AEFs serving the one or more UE 201 based on first service information identifying the one or more APIs serving the one or more UE 201, as referred in the FIG. 2. In an embodiment, the first service API information related to the one or more APIs may be stored at a CCF upon receiving the first service API information from an API Publishing Function (APF).

Continuing with the above embodiment, the process may include receiving (step 502) a service API discover request at a CCF from the API invoker transmitted for discovering the one or more AEFs serving the one or more UE 201 related to the API invoker. In an embodiment the service API discover request may include one or more UE IDs and a number of parameters associated with the service API information to be discovered. In an embodiment, the service API discover request may be received using a CAPIF_Discover_Service_API API.

In response to receiving the service API discover request at the CCF, the process may proceed towards transmitting (step 504) a Nnrf_NFDiscovery_Service request message to the NRF for retrieving NF instance information serving the one or more UE IDs received in the service API discover request. In an embodiment, the NF instance information may include a NEF and, a SCEF. In an embodiment, the Nnrf_NFDiscovery_Service request message may include the one or more UE IDs received in the service API discover request.

Moving forward, upon receiving the Nnrf_NFDiscovery_Service request message at the NRF, the process may proceed towards retrieving (step 506) NF instance information serving the one or more UE IDs. In an embodiment, the NF instance information may be retrieved by the NRF from a memory at the NRF. In an embodiment, the NF instance information may be previously stored at the NRF as specified in 3GPP TS 23.501.

Subsequent to retrieving the NF instance information from the memory by the NRF, the process may proceed towards receiving (step 508) a Nnrf_NFDiscovery_Service response message at the CCF. In an embodiment, the Nnrf_NFDiscovery_Service response message may be transmitted by the NRF to the CCF and the Nnrf_NFDiscovery_Service response message may include the NF instance information serving the one or more UE IDs. In an embodiment, the Nnrf_NFDiscovery_Service response message may also include the one or more UE IDs received in the Nnrf_NFDiscovery_Service request message from the CCF at the NRF.

Continuing with the above embodiment, upon receiving the Nnrf_NFDiscovery_Service response message at the CCF, the process may include updating (step 510) by the CCF, the first service API information based on the NF instance information received in the Nnrf_NFDiscovery_Service response message of the AEFs such as the NEF and the SCEF, and the one or more UE IDs in the first service API information.

To that understanding, upon updating the first service API information, the process may include transmitting (step 512) a service API discover response to the API invoker from the CCF. In an embodiment, the service API discover response may be transmitted as a response to the service API discover request received at the step 502. In an embodiment, the service API discover response may include the updated first service API information comprising the NF instance information of the AEFs.

In an embodiment, the above-mentioned process may be used by the CCF to fetch AEF information such as the NF instance information from another Public Land Mobile Network (PLMN), by including a target PLMN ID information in the Nnrf_NFDiscovery_Service API request to be transmitted to the NRF. Further, in an embodiment, the NRF, as specified in TS 23.501 and 29.510, may be configured to fetch the NEF/SCEF instances information also referred as the NF instance information from the target PLMN. Moving forward, in order to provide the AEF information to the AF, for UE IDs that belong to another PLMN, the CCF may be configured to use this information.

In an embodiment, the present subject matter includes another method for discovering the one or more service APIs serving the one or more UE 201 from a different CAPIF provider using a CAPIF interconnection as specified in clause 8.25 of 3GPP TS 23.222, for the API invoker to determine the CCF to contact to discover a location of the one or more service APIs servicing the one or more UE 201.

In an embodiment, the AF may be in an agreement with at least one CAPIF provider that supports a CAPIF interconnection and may be aware of CCF information to contact. In an embodiment, multiple CCFs from multiple CAPIF providers belonging to different PLMNs, may be connected and may have a business agreement for service API sharing. In an embodiment, a precondition for interaction from between the CAPIF Core Functions is a discovery of an external interface of the CAPIF core function. Achieving the discover is based on assignment of a URI to the interface exposed by the CAPIF core function that can be resolved through a multi-step process based upon use of the DNS SRV RR) or Naming Authority Pointer (NAPTR RR) as specified in IETF RFC 2782 or IETF RFC 2915 respectively. Allowing schemes where different dynamic weights may be assigned to different potential names that can then be resolved to IP addresses.

FIG. 6 illustrates an operational flow diagram 600 depicting a process for publishing and storing of service API information at a CCF, in accordance with an embodiment of the present subject matter. In an embodiment, the service API information may be sent for storing at the CCF by the APF. In an embodiment, the CCF may be triggered to store the service API information based on a service API publish request. In an embodiment, the service API information may be associated with one or more UE 201 such that the service information may include information related to the one or more service APIs serving the one or more UE 201, as referred in the FIG. 2. In an embodiment, the one or more service APIs may be linked with the one or more UE 201 through one or more UE IDs associated with the one or more UE 201.

Continuing with the above embodiment, the process may include receiving (step 602) the service API publish request message at the CCF from the APF for publishing the one or more service APIs onto the CCF. In an embodiment, the service API publish request message may be transmitted by the APF using a CAPIF_Publish_Service_API API. In an embodiment, the CAPIF_Publish_Service_API API may include the one or more UE IDs of the one or more UE 201 supported by the one or more service APIs included in the API publish request message, first service API information associated with the one or more APIs along with a number of API parameters in the table 1.

TABLE 2

| Information element | Status | Description |
| --- | --- | --- |
| API publisher information | M | The information of the API publisher may include identity, authentication and authorization information |
| Service API information | M | The service API information includes the service API name, service API type, communication type, description, Serving Area Information (optional), AEF location (optional), List of UE IDs, interface details (e.g., IP address, port number, URI), protocols, version numbers, and data format.<br>The session ID is provided corresponding to the session that provides the service. This is the corresponding session ID known to the AF over N5 or the session ID known to the UE over N1. |
| Shareable information | O (see NOTE) | Indicates whether the service API or the service API category can be published to other CCFs. And if sharing, a list of CAPIF provider domain information where the service API or the service API category can be published is contained. |

NOTE:
If the shareable information is not present, the service API is not allowed to be shared.

Table 2 depicts a number of API parameters in the API publish request message

Continuing with the above embodiment, upon receiving the service API publish request message, the process may proceed towards storing (step 604) by the CCF, the first service API information associated with one or more service APIs and the one or more UE IDs in a memory. In an embodiment, the first service API information associated with one or more service APIs and the one or more UE IDs may be stored in an API registry in the memory.

Moving forward, the process may include transmitting (step 606) by the CCF a service API publish response to the API publishing function indicating that the first service API information and the one or more UE IDs is stored at the CCF.

FIG. 7a illustrates an operational flow diagram 700a depicting a process for storing service API information serving the one or more UE 201 and associated with a number of CCFs at one CCF, in accordance with an embodiment of the present subject matter. In an embodiment, the number of CFFs may be referred as a CCF-A, a CCF-B, and a CCF-C. In an embodiment, the CCF-A, the CCF-B, and the CCF-C may interchangeably be referred as a first CCF, a third CCF and a second CCF. In an embodiment, the one CCF provider may be the second CCF storing the service API information.

Continuing with the above embodiment, the process may include receiving (step 702a), by the first CCF, first service API information, and one or more first UE IDs associated with one or more first UE from the APF. In an embodiment, the one or more first UE may be amongst the one or more UE 201, as referred in the FIG. 2. In an embodiment, the first service API information, and the one or more first UE IDs may be shared with the second CCF from the APF that is in a same CAPIF provider domain of the first CCF, or from the second CCF.

Moving forward, the process may include receiving (step 704a), by the first CCF, from a second CCF, second service API information associated with one or more second UE and one or more second UE IDs at the second CCF by the first CCF. In an embodiment, the one or more second UE may be amongst the one or more UE 201, as referred in the FIG. 2. In an embodiment, the second CCF may be configured to transmit the second service API information and the one or more second UE IDs through an Interconnection API Publish.

Upon receiving the Interconnection API publish, the process may proceed towards transmitting (step 706a) an interconnection API publish request to a third CCF. In an embodiment, the interconnection API publish request may be transmitted by the first CCF. In an embodiment, the interconnection API publish request may include at least one of the first service API information, the one or more first UE IDs and the second service API information, and the one or more second UE IDs.

Upon receiving the Interconnection API publish at the third CCF, the process may proceed towards storing (step 708a) the at least one of the first service API information, the one or more first UE IDs and the second service API information, and the one or more second UE IDs.

Subsequently, the process may proceed towards, receiving (step 710a) an interconnection API publish response from the third CCF. In an embodiment, the interconnection API publish response may be transmitted by the third CCF upon storing the at least one of the first service API information, the one or more first UE IDs and the second service API information, and the one or more second UE IDs and the interconnection API publish response may be received by the first CCF. In an embodiment, the interconnection API publish response may indicate that the received at least one of the first service API information, the one or more first UE IDs and the second service API information, and the one or more second UE IDs is stored at the third CCF.

FIG. 7b illustrates an operational flow diagram 700b depicting a process for discovering one or more service API serving one or more UE 201 from the number of CCFs using the CAPIF interconnection, in accordance with an embodiment of the present subject matter.

Continuing with the above embodiment, the process may include receiving (702b) a service API discover request from an API invoker at the first CCF. In an embodiment, the service API discover request may include the one or more UE IDs from the API invoker for determining the one or more service APIs serving the one or more UE 201.

In response to receiving the service API discover request at the first CCF, the process may include transmitting (step 704b) a service API discover response to the API invoker from the first CCF. In an embodiment, the service API discover response may include the first service API information associated with the one or more first UE IDs stored at the first CCF and the second service API information associated with the one or more second UE IDs stored at the third CCF.

Continuing with the above embodiment, the process may proceed towards fetching (step 706*b*) the second service API information and the one or more second UE IDs from the third CCF using the Interconnection Service API Discovery by the first CCF. In an embodiment, the third CCF may identify the second service API information based on the one or more UE IDs. In an embodiment, the fetching may further be performed based on the steps mentioned below.

In an embodiment, the process may include returning locally stored service API information related to the one or more second UE IDs matching query information. Further, the process may include transmitting information of the third CCF with service API category matching a discovery criterion and the one or more second UE IDs to the AF in the service API discover response. The AF may be configured to discover the service API information matching the one or more UE IDs from the third CCF, using a CAPIF_Discover_Service_API API. Further, the first CCF-A may be configured to fetch the second service API information from the third CCF using the Interconnection Service API Discovery. In an embodiment, the first CCF may include the one or more second UE IDs in the Interconnection Service API Discover request message to the CCF-B and the CCF-B returns the service API information matching the query information including the one or more second UE IDs. Further, the first CCF may return the discovered service API information from the second CCF to the AF in the discovery API response.

In an embodiment, a session ID may be provided along the one or more UE IDs in the API publish request, corresponding to a session that provides a service. In an embodiment, the session ID may be a corresponding session ID known to the AF over N5 interface or the session ID known to a UE amongst the one or more UE 201 over N1 interface. The APF may be configured to specify the session ID specifically 'bound' to a published API. In an embodiment, the session ID may be to select the service API by the CCF or the API Invoker subsequently. This may be used to bind the service API use to a particular UE session, so that the API Invoker may specifically be able to operate upon the session relevant to the intended service by means of the service API.

In an embodiment, where it is determined that the northbound APIs are exposed by a 3GPP vertical enabler layers for a consumption by vertical specific applications and a UE side functional entity is in the context of the API invocation, then a list of UE side functional entity identifiers (For example, VAL UE ID, VAL USER ID for SEAL and like so in other vertical enabler layer architectures) may be included instead of the one or more UE IDs. The service APIs may be published with the list of UE side functional entity identifiers and the API Invoker (vertical specific application) may discover the target API location based on the list of UE side functional entity identifiers.

In an embodiment of the present subject matter, the NF information may be provisioned to the UE using a control plane mechanism. In an embodiment, the UE may be provisioned with information about the CCF and/or an API Exposing Function such as the NEF, and the SCEF that serve the northbound APIs specific to the UE and sessions of the UE. The UE may provide the information to applications on the UE or other AFs. Further, the applications on the UE may fetch the CCF and/or AEF such as the NEF, and the SCEF information from the UE and transmit to the AFs serving the applications on the UE. The AFs and applications on the UE may use the information to reach an interface CCF or AEF and subsequently may invoke the northbound API for the UE and/or session of the UE, in the context of the northbound API invocation.

In an embodiment, a 5G Core Network may provision the information to the UE using the control plane mechanism over NAS, for example during a registration procedure as specified in 23.501 or a UE Configuration Update procedure as specified in TS 23.502, a service request procedure as specified in TS 23.502, a UE parameter update as specified in TS 23.502, or any other control plane based (NAS) mechanism.

In an embodiment, the UE may trigger a request for CCF and/or AEF information from the 5G Core Network or may be included by the 5G Core Network in a network triggered message. In an embodiment, the 5G Core Network may assign a session ID information along with the CCF and/or AEF information. The session ID corresponds to a session that provides the service. The session ID is a corresponding session ID known to the AF over N5 interface or the session ID known to the UE over N1 interface.

FIG. 8 illustrates a schematic block diagram 800 of a system 802 for discovering one or more APIs serving one or more UE 201, in accordance with an embodiment of the present subject matter. In an embodiment, the system 802 may be incorporated in the one or more UE 201. Examples of the UE may include, but are not limited to, a smartphone, a laptop, a Personal Computer (PC), and a tablet. In an embodiment, the UE may be configured to operate in on of a Long Term Evolution (LTE), and a New Radio (NR). In an embodiment, the one or more service APIs may interchangeably be referred as one or more northbound APIs. In an embodiment, the method may include determining a location of the one or more service APIs serving the one or more UE 201.

Continuing with the above embodiment, the system 802 may include a processor 804, a memory 806, data 808, module(s) 810, resource (s) 812, and a CCF 814. In an embodiment, the processor 804, the memory 806, the data 808, the module(s) 810, the resource(s) 812, and the CCF 814 may be communicably coupled to one another.

As would be appreciated, the system 802, may be understood as one or more of a hardware, and a configurable hardware, and the like. In an example, the processor 804 may be a single processing unit or a number of units, all of which could include multiple computing units. The processor may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 804 may be configured to fetch and/or execute computer-readable instructions and/or data 808 stored in the memory 806.

In an example, the memory 806 may include any non-transitory computer-readable medium known in the art including, for example, volatile memory, such as static random-access memory (SRAM) and/or dynamic random-access memory (DRAM), and/or non-volatile memory, such as read-only memory (ROM), erasable programmable ROM (EPROM), flash memory, hard disks, optical disks, and/or magnetic tapes. The memory 304 may include the data 808.

In an embodiment, the memory 806 includes a cache or random-access memory for the processor 804. In alternative examples, the memory 806 is separate from the processor 804, such as a cache memory of a processor, the system memory, or other memory. The memory 806 may be an external storage device or database for storing data. The memory 806 is operable to store instructions executable by the processor 804. The functions, acts or tasks illustrated in the figures or described may be performed by the programmed processor 804 for executing the instructions stored in the memory 806. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The data 808 serves, amongst other things, as a repository for storing data processed, received, and generated by one or more of, the processor 804, the memory 806, the module(s) 810, the resource(s) 812, and the CCF 814.

The module(s) 810, amongst other things, may include routines, programs, objects, components, data structures, etc., which perform particular tasks or implement data types. The module(s) 810 may also be implemented as, signal processor(s), state machine(s), logic circuitries, and/or any other device or component that manipulate signals based on operational instructions.

Further, the module(s) 810 may be implemented in hardware, instructions executed by at least one processing unit, for e.g., processor 804, or by a combination thereof. The processing unit may be a general-purpose processor which executes instructions to cause the general-purpose processor to perform operations or, the processing unit may be dedicated to performing the required functions. In another aspect of the present disclosure, the module(s) 810 may be machine-readable instructions (software) which, when executed by a processor/processing unit, may perform any of the described functionalities.

The resource(s) 812 may be physical and/or virtual components of the system 802 that provide inherent capabilities and/or contribute towards the performance of the system 802. Examples of the resource(s) 812 may include, but are not limited to, a memory (e.g., the memory 806), a power unit (e.g., a battery), a display unit etc. The resource(s) 812 may include a power unit/battery unit, a network unit (e.g., the communication interface unit 408), etc., in addition to the processor 804, the memory 806, and the display unit. In an embodiment, the display unit may be one of a liquid crystal display (LCD), an organic light-emitting diode (OLED), a flat panel display, a solid-state display, a cathode ray tube (CRT), a projector, a printer or other now known or later developed display device for outputting determined information. The display may act as an interface for the user to see the functioning of the processor 804, or specifically as an interface with the software stored in the memory 806.

In some example embodiments, the module(s) 810 may be machine-readable instructions (software) which, when executed by a processor/processing unit, perform any of the described functionalities. Continuing with the above embodiment, the CCF 814 may be configured to publish a first service information at the memory 806. In an embodiment, the CCF 814 may be configured to receive a service API publish request message from an APF. In an embodiment, the service API publish request message may include one or more UE IDs associated with the one or more UE 201, and the first service API information associated with one or more service APIs supporting the one or more UE 201. In an embodiment, the service API publish request message may be transmitted by the APF using a CAPIF-_Publish_Service_API API. Further, the CCF 814 may be configured to store the first service API information associated with one or more service APIs and the one or more UE IDs in the memory. Upon storing, the CCF 814 may be configured to transmit a service API publish response to the API publishing function indicating that the first service API information and the one or more UE IDs is stored at the CCF. In an embodiment, the first service API information may include at least one of a service API name, a service API type, a communication type, a description, serving area information, an API Exposing Function (AEF) location, a list of UE IDs, interface details, protocols, version numbers, and a data format.

Continuing with the above embodiment, the CCF 814 may be configured to receive a service API discover request message from an API invoker 816 for determining one or more service APIs serving one or more UE 201. In an embodiment, the API invoker 816 transmits the service API discover request message using a CAPIF_Discover_Service_API API.

Prior to transmitting the service API request, the API invoker 816 may be configured to assign an Uniform Resource Identifier (URI) to an external interface of the CCF 814. In an embodiment, the external interface may be discovered by the API invoker 816 for initiating an interaction with CCF 814 prior to sending the service API discover request message. Furthermore, the API invoker 816 may be configured to resolve the external interface to the CCF through one or more of a DNS SRV RR and a NAPTR RR.

In an embodiment, the service API discover request message may include one or more UE IDs and a number of parameters associated with the one or more UE 201. In response to receiving the service API discover request message, the CCF 814 may be configured to retrieve a first service API information associated with the one or more UE IDs and the number of parameters from the memory 806.

In an embodiment, for retrieving, the CCF 814 may be configured to transmit a Nnrf_NFDiscovery_Service request message to a NRF for fetching NF instances information serving the one or more UE IDs. Examples of the NF may include, but are not limited to, NEF, and SCEF. Moving forward, the CCF 814 may be configured to receive from the NRF a Nnrf_NFDiscovery_Service response message including the NF instance information serving the one or more UE IDs. In an embodiment, the NRF retrieves the Network Function (NF) instance information from a memory of the NRF. Further, the CCF 814 may be configured to update the first service API information based on the NF instance information and the one or more UE IDs in the first service API information. Furthermore, upon updating, the CCF 814 may be configured to transmit a service API discover response including the first service API information as a response to the service API discover request. In an embodiment, the one or more service APIs serving the one or more UE 201 may be discovered based on the first service API information.

In an embodiment of the present subject matter, the system 802 may be configured to store and discover the one or more service API serving the one or more UE 201 from a number of CCFs using the CAPIF interconnection. In an embodiment, the number of CCFs include the first CCF, the second CCF, and the third CCF. Further, the first CCF may be configured to receive the first service API information, and the one or more first UE IDs associated with one or more first UE from the APF. In an embodiment, the first CCF may be further configured to receive from the second CCF, second service API information associated with one or more second UE and the one or more second UE IDs at the second CCF. In an embodiment, the second CCF may be configured to transmit the second service API information and the one or more second UE IDs through an Interconnection API Publish.

Moving forward, the first CCF may be configured to transmit an interconnection API publish request to the third CCF. In an embodiment, the interconnection API publish request may include at least one of the first service API information, the one or more first UE IDs and the second service API information, and the one or more second UE IDs. Continuing with the above embodiment, the third CCF may be configured to transmit an interconnection API publish response to the first CCF indicating that the received at least one of the first service API information, the one or more first UE IDs and the second service API information, and the one or more second UE IDs is stored at the third CCF.

In an embodiment, the first CCF may be configured to receive a service API discover request including the one or more UE IDs from the API invoker 816. In an embodiment, the API invoker 816 may transmit the service API discover request for determining the one or more service APIs serving the one or more UE 201. In response, the first CCF may be configured to transmit to the API invoker 816, the service API discover response including the first service API information associated with the one or more first UE IDs stored at the first CCF and the second service API information associated with the one or more second UE IDs stored at the third CCF. Further the first CCF may be configured to fetch the second service API information and the one or more second UE IDs from the third CCF using the Interconnection Service API Discovery. In an embodiment, the third CCF may be configured to identify the second service API information based on the one or more UE IDs.

FIG. 9 illustrates various hardware components of the CCF (900) according to embodiments as disclosed herein. The CCF (900) includes at least one processor (910) and a transceiver (920). The processor (910) is coupled with the transceiver (920).

The at least one processor (910) is configured to operate methods of CCF according to FIGS. 1 to 8. The at least one processor (910) controls the transceiver (920) to operate methods of CCF according to FIGS. 1 to 8.

Although the FIG. 9 shows various hardware components of the CCF (900) but it is to be understood that other embodiments are not limited thereon. In other embodiments, the CCF (900) may include less or more number of components. Further, the labels or names of the components are used only for illustrative purpose and does not limit the scope of the disclosure. One or more components can be combined together to perform same or substantially similar function in the CCF (900).

FIG. 10 illustrates various hardware components of the API invoker (1000) according to embodiments as disclosed herein. The API invoker (1000) includes at least one processor (1010) and a transceiver (1020). The processor (1010) is coupled with the transceiver (920).

The at least one processor (1010) is configured to operate methods of API invoker according to FIGS. 1 to 8. The at least one processor (1010) controls the transceiver (920) to operate methods of API invoker according to FIGS. 1 to 8.

Although the FIG. 10 shows various hardware components of the API invoker (1000) but it is to be understood that other embodiments are not limited thereon. In other embodiments, the API invoker (1000) may include less or more number of components. Further, the labels or names of the components are used only for illustrative purpose and does not limit the scope of the disclosure. One or more components can be combined together to perform same or substantially similar function in the API invoker (1000).

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method performed by a common application program interface (API) framework core function (CCF) for discovering an API serving a user equipment (UE), the method comprising:
receiving, from an API publishing function (APF), a service API publish request message including first service API information, for publishing the first service API information, wherein the first service API information includes a list of UE internet protocol (IP) addresses;
storing the first service API information in an API registry;
receiving, from an API invoker, a service API discover request message including a UE IP address for discovering at least one service API;
retrieving the first service API information from the API registry based on the UE IP address, wherein the first service API information corresponds to the service API discover request message; and
transmitting, to the API invoker, a service API discover response message including the first service API information.

2. The method of claim 1, wherein the service API discover request message is received from the API invoker using a CAPIF_Discover_Service_API API.

3. The method of claim 1, further comprising:
transmitting, to the APF, a service API publish response indicating that the first service API information is stored at the CCF.

4. The method of claim 1, wherein the first service API information includes at least one of a service API name, and a service API type.

5. The method of claim 1, wherein the service API publish request message is received from the APF using a CAPIF_Publish_Service_API API.

6. The method of claim 3, further comprising:
transmitting, to a second CCF, an interconnection API publish request message including at least one of the first service API information, and the UE IP address; and
receiving, from the second CCF, an interconnection API publish response message indicating that the at least one of the first service API information, and the UE IP address are stored at the second CCF.

7. The method of claim 6, further comprising:
receiving, from the API invoker, the service API discover request message including a second UE IP address for discovering at least one second service API serving a second UE; and
transmitting, to the second CCF, an interconnection service API discover request message including the second UE IP address.

8. The method of claim 7, further comprising:
receiving, from the second CCF, an interconnection service API discover response message including second service API information associated with the second UE IP address based on the interconnection service API discover request message.

9. The method of claim 1, wherein determining the first service API information comprises:
transmitting, to a network repository function (NRF), a Nnrf_NFDiscovery_Service request message for fetching network function (NF) instance information serving the UE IP address;
receiving, from the NRF, a Nnrf_NFDiscovery_Service response message including the NF instance information serving the UE IP address, wherein the NRF retrieves the NF instance information; and
updating the first service API information based on the NF instance information and the UE IP address in the first service API information.

10. The method of claim 1,
wherein a uniform resource identifier (URI) to an external interface of the CCF is assigned by the API invoker,
wherein the external interface is discovered by the API invoker for initiating an interaction with the CCF prior to sending the service API discover request message, and
wherein the external interface to the CCF is resolved by the API invoker through at least one of a domain name system service location resource record (DNS SRV RR) and a naming authority pointer resource record (NAPTR RR).

11. A common application programming interface (API) framework core function (CCF) entity for discovering an API serving a user equipment (UE), the CCF entity comprising:
a transceiver; and
at least one processor coupled to the transceiver,
wherein the at least one processor is configured to:
receive, from an API publishing function (APF), a service API publish request message including first service API information, for publishing the first service API information, wherein the first service API information includes a list of UE internet protocol (IP) addresses,
store the first service API information in an API registry,
receive, from an API invoker, a service API discover request message including a UE IP address for discovering at least one service API,
retrieve the first service API information from the API registry based on the UE IP address, wherein the first service API information corresponds to the service API discover request message, and
transmit, to the API invoker, a service API discover response message including the first service API information.

12. The CCF entity of claim 11, wherein the service API discover request message is transmitted by the API invoker using a CAPIF_Discover_Service_API API.

13. The CCF entity of claim 11, wherein the at least one processor is further configured to:
transmit, to the APF, a service API publish response indicating that the first service API information is stored at the CCF entity.

14. The CCF entity of claim 11, wherein the first service API information includes at least one of a service API name, and a service API type.

15. The CCF entity of claim 11, wherein the service API publish request message is received from the APF using a CAPIF_Publish_Service_API API.

16. The CCF entity of claim 13, wherein the at least one processor is further configured to:
transmit, to a second CCF entity, an interconnection API publish request message including at least one of the first service API information, and the UE IP address, and
receive, from the second CCF entity, an interconnection API publish response message indicating that the at least one of the first service API information, and the UE IP address are stored at the second CCF entity.

17. The CCF entity of claim 16, wherein the at least one processor is further configured to:
receive, from the API invoker, the service API discover request message including a second UE IP address for discovering at least one second service API serving a second UE, and
transmit, to the second CCF entity, an interconnection service API discover request message including the second UE IP address.

18. The CCF entity of claim 17, wherein the at least one processor is further configured to:
receive, from the second CCF, an interconnection service API discover response message including second service API information associated with the second UE IP address based on the interconnection service API discover request message.

19. The CCF entity of claim 11, wherein the at least one processor is further configured to:
transmit, to a network repository function (NRF), a Nnrf_NFDiscovery_Service request message for fetching network function (NF) instance information serving the UE IP address,
receive, from the NRF, a Nnrf_NFDiscovery_Service response message including the NF instance information serving the UE IP address, wherein the NRF retrieves the NF instance information, and
update the first service API information based on the NF instance information and the UE IP address in the first service API information.

20. The CCF entity of claim 11,
wherein a uniform resource identifier (URI) to an external interface of the CCF entity is assigned by the API invoker,
wherein the external interface is discovered by the API invoker for initiating an interaction with the CCF entity prior to sending the service API discover request message, and
wherein the external interface to the CCF entity is resolved by the API invoker through at least one of a domain name system service location resource record (DNS SRV RR) and a naming authority pointer resource record (NAPTR RR).

* * * * *